US012594210B2

(12) United States Patent
Shin et al.

(10) Patent No.: US 12,594,210 B2
(45) Date of Patent: Apr. 7, 2026

(54) FLEXIBLE WEARABLE ROBOT

(71) Applicant: AGENCY FOR DEFENSE DEVELOPMENT, Daejeon (KR)

(72) Inventors: Young June Shin, Daejeon (KR); Man Bok Hong, Daejeon (KR); Gwang Tae Kim, Daejeon (KR); Yongcheol Kim, Daejeon (KR); Hanseung Woo, Daejeon (KR); Sanghun Ju, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 1065 days.

(21) Appl. No.: 17/690,978

(22) Filed: Mar. 9, 2022

(65) Prior Publication Data

US 2023/0076543 A1 Mar. 9, 2023

(30) Foreign Application Priority Data

Sep. 3, 2021 (KR) ........................ 10-2021-0117581

(51) Int. Cl.
A61H 3/00 (2006.01)
B25J 9/00 (2006.01)
(Continued)

(52) U.S. Cl.
CPC .............. A61H 3/00 (2013.01); B25J 9/0006 (2013.01); B25J 9/104 (2013.01); H02K 7/1004 (2013.01);
(Continued)

(58) Field of Classification Search
CPC ................. A61H 3/00; A61H 2003/007; A61H 2201/1215; A61H 2201/164; A61H 2201/165; A61H 2201/1671; A61H 2201/5058; A61H 2201/1445; A61H 2201/1623; A61H 2201/14; A61H 2205/106; A61H 2205/108; A61H 1/024;
(Continued)

(56) References Cited

U.S. PATENT DOCUMENTS 10,843,332 B2 11/2020 Walsh et al.
2018/0116851 A1* 5/2018 Lee ........................ A61F 5/0102

FOREIGN PATENT DOCUMENTS

CN 109662869 A * 4/2019 ............... A61H 3/00
CN 111230840 A * 6/2020 ............ B25J 9/0006
(Continued)

*Primary Examiner* — Tu A Vo
*Assistant Examiner* — Kelsey E Baller
(74) *Attorney, Agent, or Firm* — MARSHALL, GERSTEIN & BORUN LLP

(57) ABSTRACT

A flexible wearable robot for assisting with a walking motion of a user may include a thigh strap to be worn to enclose a thigh portion of a user, a shank strap to be worn to enclose a shank portion of the user, a driver to be worn on a back or waist portion of the user to provide a driving force for assisting with a walking motion of the user, a first driving wire with one end connected to the thigh strap and the other end connected to the driver to receive tension, a second driving wire with one end connected to the shank strap and the other end connected to the driver to receive tension, and a controller to control a drive of the driver to selectively apply tension to at least one of the first driving wire and the second driving wire.

15 Claims, 8 Drawing Sheets

(51) Int. Cl.
    *B25J 9/10* (2006.01)
    *H02K 7/10* (2006.01)
    *H02K 7/116* (2006.01)
(52) U.S. Cl.
    CPC ........ *H02K 7/116* (2013.01); *A61H 2003/007*
        (2013.01); *A61H 2201/1215* (2013.01); *A61H*
            *2201/164* (2013.01); *A61H 2201/165*
        (2013.01); *A61H 2201/1671* (2013.01); *A61H*
            *2201/5058* (2013.01); *A61H 2205/106*
            (2013.01); *A61H 2205/108* (2013.01)
(58) Field of Classification Search
    CPC ....... A61H 1/0266; B25J 9/0006; B25J 9/104;
            B25J 9/126; B25J 9/106; B25J 9/1045;
                    H02K 7/1004; H02K 7/116
    See application file for complete search history.

(56)                References Cited

FOREIGN PATENT DOCUMENTS

| CN | 111568703 | A |   | 8/2020 |  |  |
|----|-----------|---|---|--------|--|--|
| CN | 110202553 | B | * | 8/2024 | ........... | B25J 9/0006 |
| KR | 10-2016-0046358 | A |   | 4/2016 |  |  |
| KR | 10-2016-0098354 | A |   | 8/2016 |  |  |
| KR | 101693976 | B1 |   | 1/2017 |  |  |
| KR | 102183576 | B1 |   | 11/2020 |  |  |
| WO | WO-2012100250 | A1 | * | 7/2012 | .............. | A61H 3/00 |

* cited by examiner

FLEXIBLE WEARABLE ROBOT

CROSS-REFERENCE TO RELATED APPLICATION

This application claims the benefit of Korean Patent Application No. 10-2021-0117581 filed on Sep. 3, 2021, in the Korean Intellectual Property Office, the entire disclosure of which is incorporated herein by reference for all purposes.

BACKGROUND

1. Field of the Invention

The following description relates to a flexible wearable robot.

2. Description of the Related Art

Many exoskeleton robots have been developed for assisting humans. Of the exoskeleton robots, an active exoskeleton robot supports a force needed for a human body using an electric/hydraulic driver. In addition, recently, exoskeleton robots that flexibly generate a force using wires are being developed. Such exoskeleton robots include a flexible wearable robot that utilizes a flexible material such as a wire or an elastic band to transmit an assistance force to a wearer, unlike the existing exoskeleton robots.

Existing flexible wearable robots for lower limbs have been developed to assist one predetermined joint, such as an ankle, a knee, or a hip joint, with one driving device due to limitations in system weight and size. Accordingly, a total of six drivers are needed to assist the ankles, knees, and hip joints at the same time, and thus, additional devices such as motor drivers are required therefor. Operating multiple drivers increases the size and battery consumption.

The above description is information the inventor(s) acquired during the course of conceiving the present disclosure, or already possessed at the time, and is not necessarily art publicly known before the present application was filed.

SUMMARY

Example embodiments provide a flexible wearable robot.

According to an aspect, there is provided a flexible wearable robot for assisting with a walking motion of a user, the flexible wearable robot including a thigh strap to be worn to enclose a thigh portion of a user, a shank strap to be worn to enclose a shank portion of the user, a driver to be worn on a back or waist portion of the user to provide a driving force for assisting with a walking motion of the user, a first driving wire with one end connected to the thigh strap and the other end connected to the driver to receive tension, a second driving wire with one end connected to the shank strap and the other end connected to the driver to receive tension, and a controller to control a drive of the driver to selectively apply tension to at least one of the first driving wire and the second driving wire.

The thigh strap may include a thigh-fixed portion to which an end portion of the first driving wire connected from the driver is connected, and which is installed on a rear side of the thigh strap based on the user, and a front wire passage for receiving and enclosing the second driving wire extending from the driver toward the shank strap, and installed on a front side of the thigh strap based on the user, and the shank strap may include a shank-fixed portion to which an end portion of the second driving wire connected from the driver is connected, and which is installed on a front side of the shank strap based on the user.

The driver may include a driving actuator for generating a rotational driving force, a rotating shaft connected to the driving actuator to be rotationally driven, a first wire manipulator installed to rotate by means of the rotating shaft with one end of the first driving wire fixed, and a second wire manipulator installed to rotate by means of the rotating shaft with one end of the second driving wire fixed, wherein the controller may selectively drive at least one of the first wire manipulator and the second wire manipulator.

The first wire manipulator may include a first pulley rotatably installed with one side of the first driving wire hung thereon, and a first clutch gear installed on the rotating shaft to be connected to selectively engage with the first pulley when driven by the controller to transmit a rotational driving force, and the second wire manipulator may include a second pulley rotatably installed with one side of the second driving wire hung thereon, and a second clutch gear installed on the rotating shaft to be connected to selectively engage with the second pulley when driven by the controller to transmit a rotational driving force, wherein the controller may selectively drive at least one of the first clutch gear and the second clutch gear to selectively apply tension to the first driving wire or the second driving wire.

The first pulley and the second pulley may include internal gear portions that are toothed along inner circumferential surfaces thereof, respectively, and the first clutch gear and the second clutch gear may include a first clutch portion and a second clutch portion to be linearly driven in a direction perpendicular to the rotating shaft to selectively engage with the internal gear portions of the first pulley and the second pulley, respectively.

The flexible wearable robot may further include a guide frame formed in a link structure connecting the thigh strap and the shank strap to guide a knee joint motion of the user, wherein a portion of the guide frame connected to the thigh strap may be installed to be parallel with and touch a rear side of the front wire passage.

The guide frame may include an upper frame fixed to the thigh strap and protruding toward the shank strap, a lower frame fixed to the shank strap and protruding toward the thigh strap, and a joint portion mutually rotatably connecting respective protrusions of the upper frame and the lower frame, wherein the joint portion may have a pulley shape in which a groove is formed along an outer circumferential surface thereof such that the second driving wire may be hung thereon.

The flexible wearable robot may further include an ankle-fixed portion to be worn on a heel portion of the user, a third driving wire with one end connected to the shank strap and the other end connected to the driver to receive tension, and a wire guide enclosing the third driving wire extending between the thigh strap and the shank strap, wherein the controller may control the drive of the driver to selectively apply tension to at least one of the first driving wire, the second driving wire, and the third driving wire.

The thigh strap may further include a rear wire passage for receiving and enclosing the third driving wire extending from the driver toward the shank strap, and installed on a rear side of the thigh strap based on the user, and the shank strap may further include a lower wire passage for receiving and enclosing the third driving wire extending from the driver via the thigh strap toward the ankle-fixed portion, and installed on a rear side of the shank strap based on the user.

The flexible wearable robot may further include an inertial sensor installed on at least one of the thigh strap, the shank strap, and the ankle-fixed portion, wherein the controller may (i) determine a gradient of a ground that the user walks on based on a signal measured by the inertial sensor, and (ii) drive, based on the gradient, at least one of the first driving wire, the second driving wire, and the third driving wire to assist with a joint motion necessary for walking on the ground having the gradient.

According to an aspect, there is provided a flexible wearable robot for assisting with a walking motion of a user, the flexible wearable robot including a thigh strap to be worn to enclose a thigh portion of a user, a shank strap to be worn to enclose a shank portion of the user, an ankle-fixed portion to be worn on a heel portion of the user, a driver to be worn on a back or waist portion of the user to provide a driving force for assisting with a walking motion of the user, a driving wire connected from the driver to receive tension, a first fastening wire with one end fixed to the thigh strap and the other end exposed to an outside of the thigh strap, a second fastening wire with one end fixed to the shank strap and the other end passing through the thigh strap and exposed to the outside, and a third fastening wire with one end fixed to the ankle-fixed portion and the other end sequentially passing through the shank strap and the thigh strap and exposed to the outside.

The flexible wearable robot may further include a guide frame formed in a link structure connecting the thigh strap and the shank strap to guide a knee joint motion of the user, wherein the guide frame may include an upper frame fixed to the thigh strap and protruding toward the shank strap, a lower frame fixed to the shank strap and protruding toward the thigh strap, and a joint portion mutually rotatably connecting respective protrusions of the upper frame and the lower frame, wherein the joint portion may have a pulley shape in which a groove is formed along an outer circumferential surface thereof such that the second fastening wire is hung thereon.

The driving wire may be detachably fastened to the first fastening wire, the second fastening wire, or the third fastening wire.

The driving wire may include a hook-shaped fastening end portion at an end portion protruding toward an outside of the driver, and the first fastening wire, the second fastening wire, or the third fastening wire may include a ring-shaped fastening member to be fastened to the fastening end portion at an end portion exposed to the outside of the thigh strap.

The driving wire may include a fastening end portion with a magnet member at an end portion protruding toward an outside of the driver, and the first fastening wire, the second fastening wire, or the third fastening wire may include a fastening member with a magnet member to be coupled to the fastening end portion at an end portion exposed to the outside of the thigh strap.

The driving wire may include a fastening end portion with a protrusion protruding laterally at an end portion protruding toward an outside of the driver, and the first fastening wire, the second fastening wire, or the third fastening wire may include a fastening member with a groove in a slot shape to receive and engage with the protrusion of the fastening end portion and to be coupled to the fastening end portion at an end portion exposed to an outside of the thigh strap.

Additional aspects of example embodiments will be set forth in part in the description which follows and, in part, will be apparent from the description, or may be learned by practice of the disclosure.

According to example embodiments, a flexible wearable robot may allow a user to selectively drive/connect a wire for assisting with a joint motion necessary for a walking motion, and thus, a driving device may be configured to be compact and lightweight.

According to example embodiments, a flexible wearable robot may selectively assist a predetermined joint, such as an ankle, a knee, or a hip joint, according to a situation with a single driver and thus, is advantageous in terms of system size, weight, and energy consumption.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
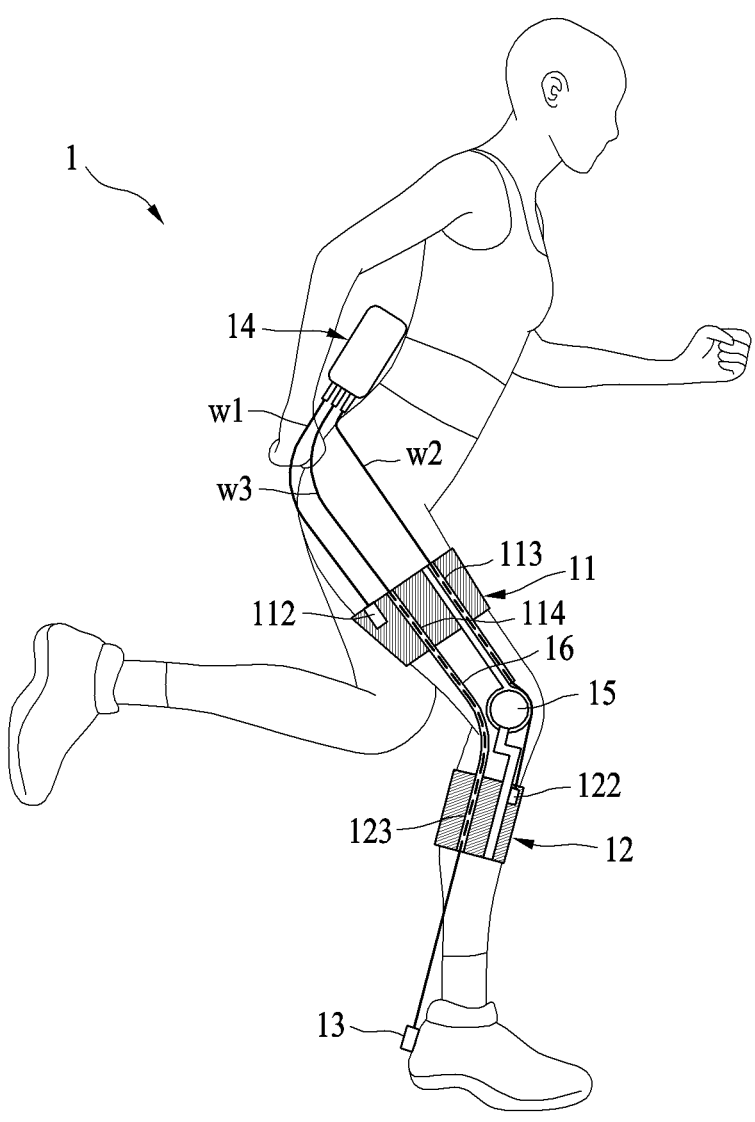
FIG. 1 is a view illustrating a user wearing a flexible wearable robot according to an example embodiment.

Hereinafter, embodiments of the present disclosure will be described with reference to the accompanying drawings. Regarding the reference numerals assigned to the components in the drawings, it should be noted that the same components will be designated by the same reference numerals, wherever possible, even though they are shown in different drawings. Also, in the description of the embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

Figure 2:
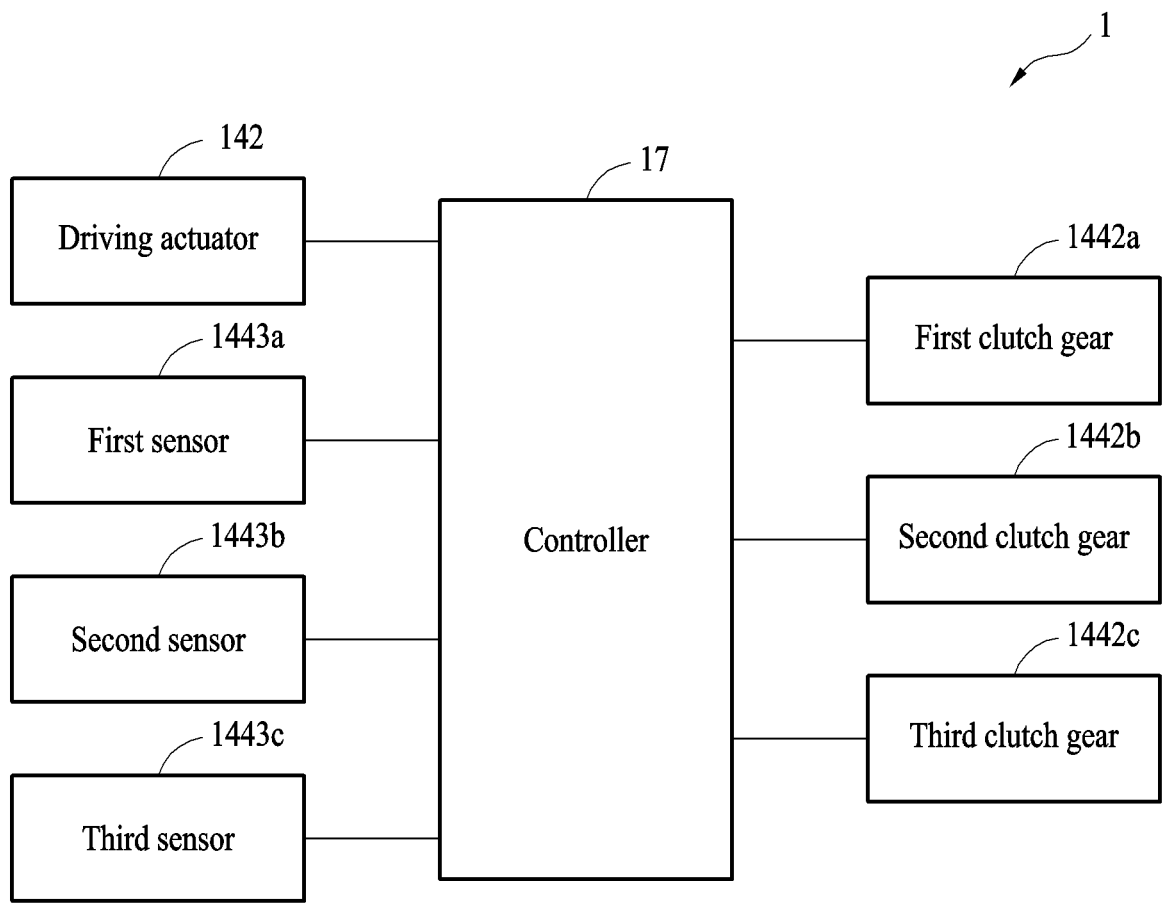
FIG. 2 is a block diagram illustrating a flexible wearable robot according to an example embodiment.
Figure 3:
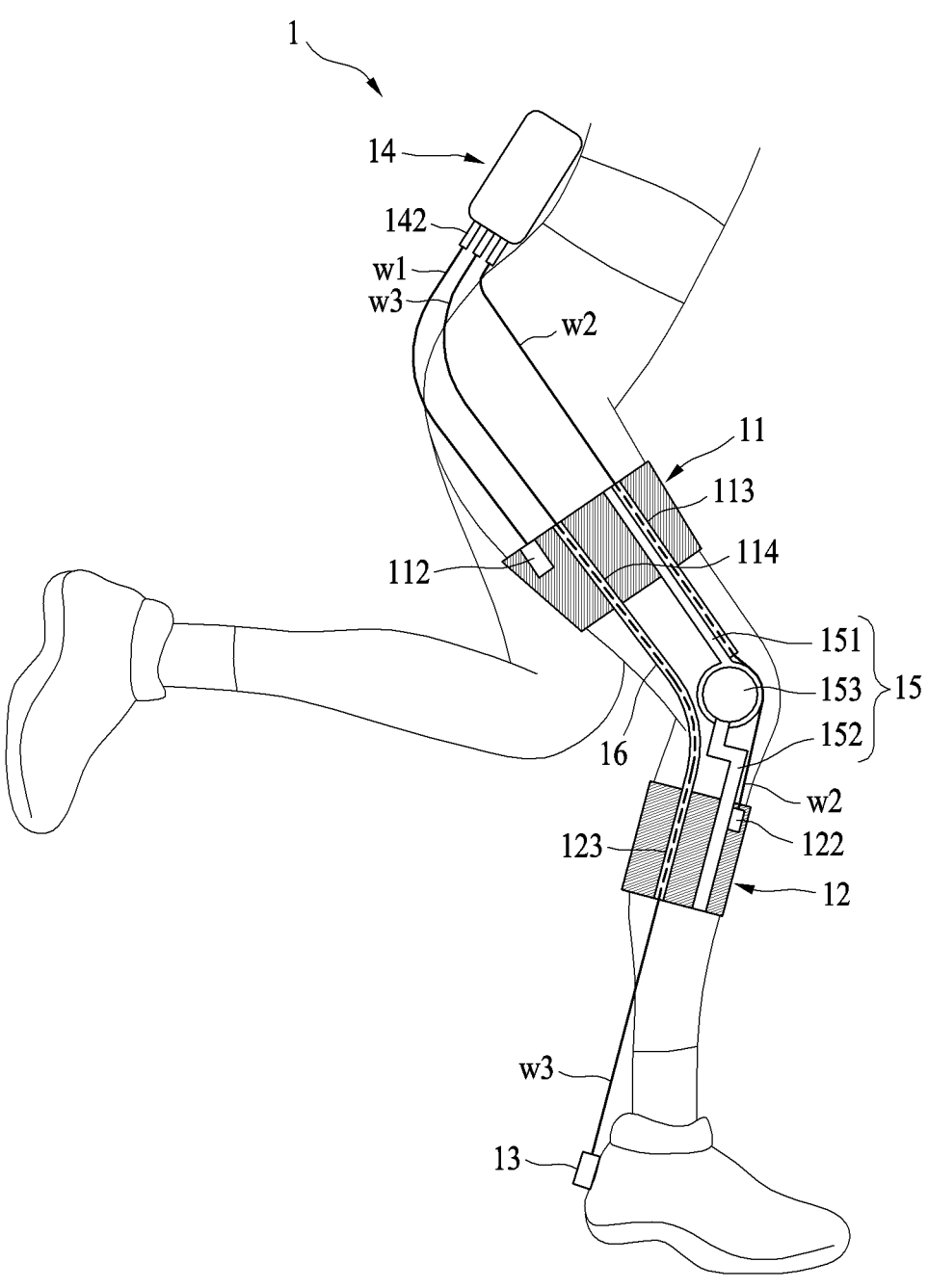
FIG. 3 is a view illustrating a flexible wearable robot according to an example embodiment.
Figure 4:
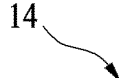
FIG. 4 is a view illustrating a structure of a driver of a flexible wearable robot according to an example embodiment.
Figure 4:
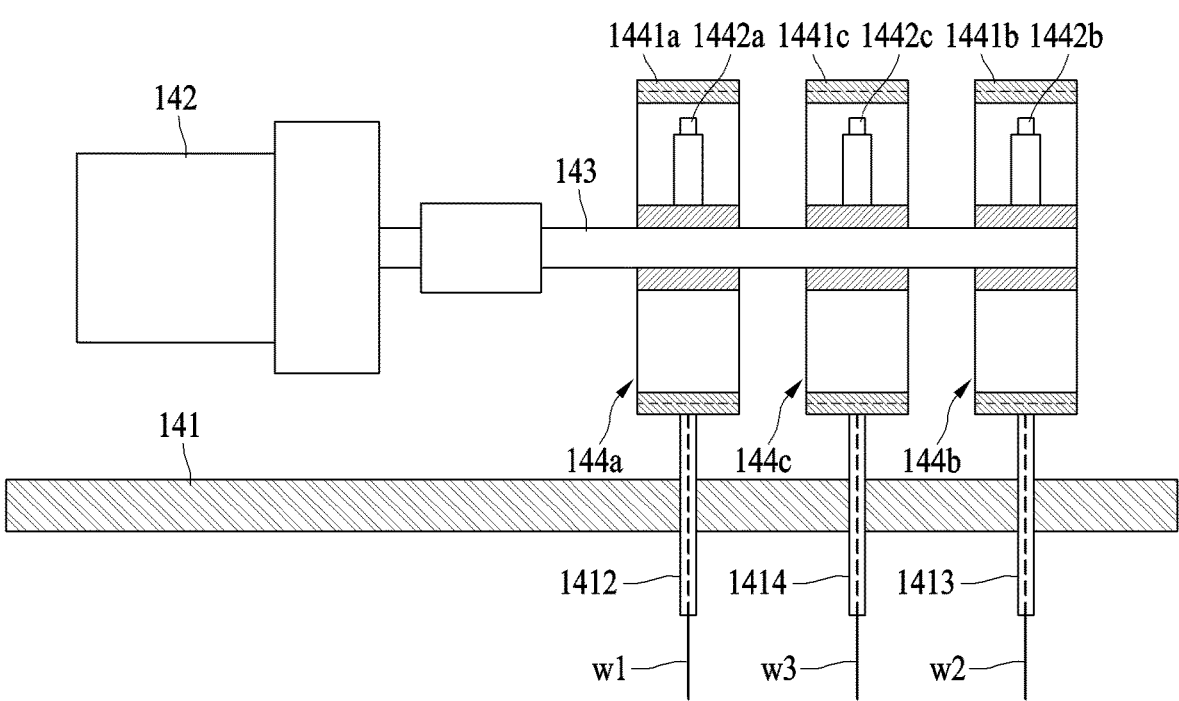
Figure 5A:
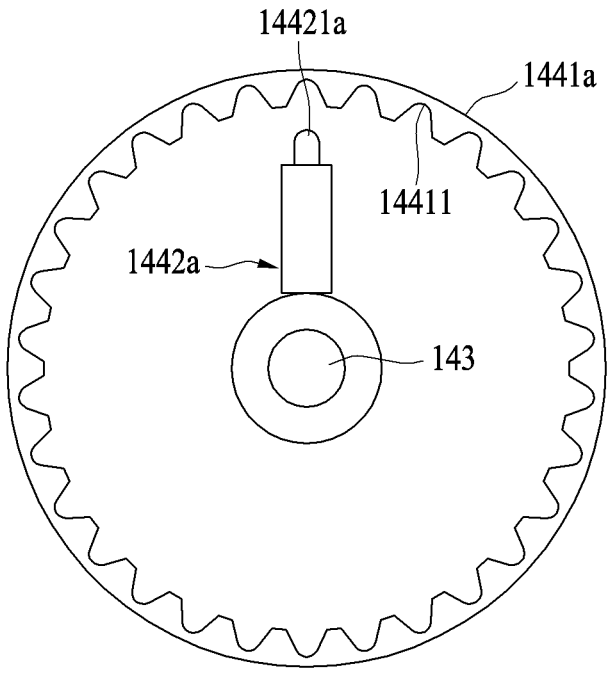
FIGS. 5A and 5B are views illustrating a clutch operation configuration of a flexible wearable robot according to an example embodiment.
Figure 5B:
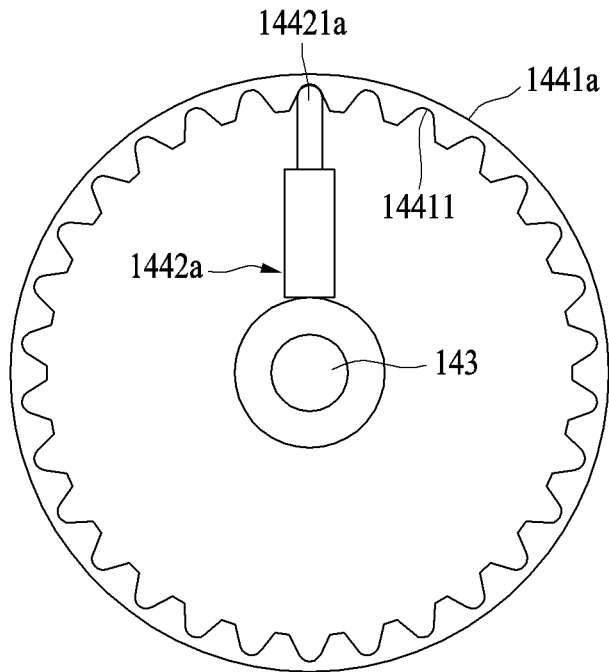

FIG. 1 is a view illustrating a user wearing a flexible wearable robot according to an example embodiment, FIG. 2 is a block diagram illustrating the flexible wearable robot according to an example embodiment, FIG. 3 is a view illustrating the flexible wearable robot according to an example embodiment, FIG. 4 is a view illustrating a structure of a driver of the flexible wearable robot according to an example embodiment, and FIGS. 5A and 5B are views illustrating a clutch operation configuration of the flexible wearable robot according to an example embodiment.

Referring to FIGS. 1 to 5, a flexible wearable robot 1 may be installed to be worn on a lower limb of a user to provide an assistance force selectively to multiple joints.

The flexible wearable robot 1 may include a thigh strap 11, a shank strap 12, an ankle-fixed portion 13, a driver 14, a first driving wire w1, a second driving wire w2, a third driving wire w3, a guide frame 15, a wire guide 16, and a controller 17.

The thigh strap 11 may be worn to enclose a thigh portion of the user. For example, the thigh strap 11 may be formed of a flexible lightweight polymer or fiber material.

For example, the thigh strap 11 may include a thigh-fixed portion 112 to which an end portion of the first driving wire w1 connected from the driver 14 is connected, a front wire passage 113 through which the second driving wire w2 extending from the driver 14 toward the shank strap 12 passes, and a rear wire passage 114 through which the third driving wire w3 extending from the driver 14 toward the shank strap 12 passes.

The thigh-fixed portion 112 may be installed on a rear side of the thigh strap 11 based on the user wearing the thigh strap 11.

For example, based on a state in which the user stands upright on a ground, the first driving wire w1 connected from the driver 14 to the thigh-fixed portion 112 may extend in a direction parallel to a vertical direction relatively.

According to the above structure, it is possible to provide an assistance force to extend a hip joint connected to the thigh portion of the user with the thigh strap 11 installed, using the tension applied from the driver 14 to the first driving wire w1.

The front wire passage 113 may include a passage extending in a longitudinal direction of the thigh of the user. For example, the front wire passage 113 may be installed in a front side of the thigh-fixed portion 112 based on the user wearing the thigh strap 11.

For example, the front wire passage 113 may guide the second driving wire w2 connected from the driver 14 to be connected to a shank-fixed portion 122 of the shank strap 12 after passing through the front wire passage 113, thereby guiding a direction of the tension of the second driving wire w2 applied to the shank strap 12 according to the drive of the second driving wire w2.

The rear wire passage 114 may include a passage extending in the longitudinal direction of the thigh of the user. For example, the rear wire passage 114 may be installed on the rear side of the thigh strap 11 based on the user wearing the thigh strap 11.

For example, the rear wire passage 114 may guide the third driving wire w3 connected from the driver 14 to pass through a lower wire passage 123 of the shank strap 12 after passing through the rear wire passage 114.

The shank strap 12 may be worn to enclose a shank portion of the user. For example, the shank strap 12 may be formed of a flexible lightweight polymer or fiber material.

For example, the shank strap 12 may include the shank-fixed portion 122 to which an end portion of the second driving wire w2 connected from the driver 14 is connected, and the lower wire passage 123 through which the third driving wire w3 extending from the driver 14 toward the ankle-fixed portion 13 passes.

The shank-fixed portion 122 may be installed on a front side of the shank strap 12 based on the user wearing the shank strap 12.

The lower wire passage 123 may include a passage extending in a longitudinal direction of the shank of the user. For example, the lower wire passage 123 may be installed on a rear side of the shank strap 12 based on the user wearing the shank strap 12.

For example, the lower wire passage 123 may guide the third driving wire w3 connected from the driver 14 to be connected to the ankle-fixed portion 13 after passing through the lower wire passage 123, thereby guiding a direction of the tension of the third driving wire w3 applied to the ankle-fixed portion 13 according to the drive of the third driving wire w3.

The ankle-fixed portion 13 may be installed to be fixed to a heel portion of the user, and an end portion of the third driving wire w3 connected from the driver 14 may be connected to the ankle-fixed portion 13.

For example, the ankle-fixed portion 13 may be installed to be worn on a foot of the user. For example, the ankle-fixed portion 13 may be installed on a heel portion of a shoe of the user.

The driver 14 may provide a driving force to assist with a joint motion of the user. For example, the driver 14 may selectively extend the first driving wire w1, the second driving wire w2, or the third driving wire w3.

For example, the driver 14 may be worn on a back or waist portion of the user. For example, the driver 14 may be worn to be carried on the back of the user, as shown in FIG. 1.

For example, the driver 14 may include a housing 141 to be worn by the user, a driving actuator 142 for generating a driving force, a rotating shaft 143 connected to the driving actuator 142 to rotate, a first wire manipulator 144a rotatably connected to the rotating shaft 143 with one end of the first driving wire w1 hung while fixed, a second wire manipulator 144b rotatably connected to the rotating shaft 143 with one end of the second driving wire w2 hung while fixed, and a third wire manipulator 144c rotatably connected to the rotating shaft 143 with one end of the third driving wire w3 hung while fixed.

The housing 141 may be a casing member that is installed to be worn by the user and has an inner space for receiving the driving actuator 142. For example, the housing 141 may be installed on the back or waist of the user.

For example, the housing 141 may include, in the inner space thereof, a first wire tube 1412 enclosing an extending portion of the first driving wire w1 that passes outward, a second wire tube 1413 enclosing an extending portion of the second driving wire w2 that passes outward, and a third wire tube 1414 enclosing an extending portion of the third driving wire w3 that passes outward.

The driving actuator 142 may generate a driving force for driving the first driving wire w1, the second driving wire w2, or the third driving wire w3. For example, the driving actuator 142 may be a motor connected to the rotating shaft 143 to be rotationally driven.

The first wire manipulator 144*a* may include a first pulley 1441*a* on which the first driving wire w1 is hung, a first clutch gear 1442*a* installed on the rotating shaft 143 and connected to selectively engage with the first pulley 1441*a* when driven by the controller 17, and a first sensor 1443*a* for sensing a rotational displacement of the first pulley 1441*a*.

The first pulley 1441*a* may rotate to wind the first driving wire w1, thereby applying tension to the first driving wire w1.

For example, a rotation axis of the first pulley 1441*a* may be parallel to a rotation axis of the rotating shaft 143. For example, as shown in FIGS. 4, 5A and 5B, the rotational axis of the first pulley 1441*a* may be concentric with the rotational axis of the rotating shaft 143.

For example, the first pulley 1441*a* may include an internal gear portion 14411 that is toothed along an inner circumferential surface thereof, as shown in FIGS. 4 to 5B.

The first clutch gear 1442*a* may include a first clutch portion 14421*a* that is rotatable while coupled to the rotating shaft 143 and moves to selectively engage with the internal gear portion 14411 of the first pulley 1441*a* when driven by the controller 17.

For example, the first clutch portion 14421*a* may be a linear driver that is linearly movable in a direction perpendicular to the rotating shaft 143, as shown in FIGS. 4 to 5B.

According to the above structure, as shown in FIGS. 5A and 5B, when driven by the controller 17, the first clutch portion 14421*a* may move in the direction perpendicular to the rotating shaft 143 and protrude until engaging with the internal gear portion 14411 of the first pulley 1441*a*. Thereafter, when the first clutch portion 14421*a* engages with the first pulley 1441*a*, a rotational force of the rotating shaft 143 may be transmitted to the first pulley 1441*a*.

By means of the first clutch gear 1442*a*, the first clutch portion 14421*a* may be connected to selectively engage with the first pulley 1441*a* when driven by the controller 17. Thus, it is possible to selectively control the tension applied to the first driving wire w1 through the drive of the driving actuator 142.

As another example, the first clutch gear 1442*a* may be a configuration of a powered clutch that is selectively installed between the rotating shaft 143 and the first pulley 1441*a* to selectively apply or block the rotational force transmitted to the first pulley 1441*a*.

The second wire manipulator 144*b* may include a second pulley 1441*b* on which the second driving wire w2 is hung, a second clutch gear 1442*b* installed on the rotating shaft 143 and connected to selectively engage with the second pulley 1441*b* when driven by the controller 17, and a second sensor 1443*b* for sensing a rotational displacement of the second pulley 1441*b*.

The third wire manipulator 144*c* may include a third pulley 1441*c* on which the third driving wire w3 is hung, a third clutch gear 1442*c* installed on the rotating shaft 143 and connected to selectively engage with the third pulley 1441*c* when driven by the controller 17, and a third sensor 1443*c* for sensing a rotational displacement of the third pulley 1441*c*.

A coupling structure between the second clutch gear 1442*b* and the second pulley 1441*b* and/or a fastening structure between the third clutch gear 1442*c* and the third pulley 1441*c* may include the fastening structure between the first clutch gear 1442*a* and the first pulley 1441*a* described with reference to FIGS. 5A and 5B. Thus, a description of the detailed configuration may be omitted.

The first driving wire w1 may be connected from the driver 14 to the thigh-fixed portion 112 of the thigh strap 11.

The second driving wire w2 may be connected from the driver 14 via the front wire passage 113 of the thigh strap 11 to the shank-fixed portion 122 of the shank strap 12.

The third driving wire w3 may be connected from the driver 14 via the rear wire passage 114 of the thigh strap 11 and then the lower wire passage 123 of the shank strap 12 to the ankle-fixed portion 13.

The guide frame 15 may have a two-segment link structure connected between the thigh strap 11 and the shank strap 12. Alternatively, the guide frame may have a four-segment link structure.

For example, the guide frame 15 may include an upper frame 151 fixed to the thigh strap 11, a lower frame 152 fixed to the shank strap 12, and a joint portion 153 mutually rotatably connecting the upper frame 151 and the lower frame 152.

The upper frame 151 may have a link structure extending in the longitudinal direction of the thigh strap 11 as shown in FIGS. 1 and 3, and may extend such that an upper end portion thereof protrudes toward the shank strap 12.

For example, the upper frame 151 may be installed to be parallel with and touch the front wire passage 113. For example, as shown in FIG. 3, the upper frame 151 may be installed to be in parallel with and touch a rear side of the front wire passage 113.

According to the above structure, the guide frame 15 may support the front wire passage 113 and a portion of the second driving wire w2 protruding downward from the thigh strap 11 not to unnecessarily deform, and guide a path of the second driving wire w2 such that the second driving wire w2 passing through the front wire passage 113 may be stably hung on a pulley portion formed on an outer circumferential surface of the joint portion 153.

The lower frame 152 may have a link structure extending in the longitudinal direction of the shank strap 12 as shown in FIGS. 1 and 3, and may extend such that an upper end thereof protrudes toward the thigh strap 11.

For example, the lower frame 152 may be installed to touch the shank-fixed portion 122. For example, the lower frame 152 may be installed to touch a rear side of the shank-fixed portion 122.

The joint portion 153 may include a hinge joint configuration for connecting an end portion of the upper frame 151 protruding from the thigh strap 11 and an end portion of the lower frame 152 protruding from the shank strap 12 so as to be articulated and driven.

For example, the joint portion 153 may include a pulley portion in which a groove is formed along an outer circumferential surface thereof such that the second driving wire w2 may be hung thereon.

The guide frame 15 may guide a knee joint motion of the user wearing the thigh strap 11 and the shank strap 12 and at the same time support the second driving wire w2 connected between the thigh strap 11 and the shank strap 12 to have a stable position. In addition, the guide frame 15 may guide the second driving wire w2 to run over the pulley portion of the joint portion 153 while wound thereon, thereby providing a force for extending the upper frame 151 and the lower frame 152 using the tension applied to the second driving wire w2, that is, a force for assisting with the extension of a knee joint between the thigh portion and the shank portion of the user.

The wire guide 16 may be a flexible tubular member enclosing the third driving wire w3 extending between the thigh strap 11 and the shank strap 12.

For example, the wire guide 16 may be connected between the rear wire passage 114 of the thigh strap 11 and the lower wire passage 123 of the shank strap 12. For example, as shown in FIG. 3, the wire guide 16, the rear wire passage 114, and the lower wire passage 123 may be integrally connected and formed as a single tubular member.

The configuration of the third driving wire w3 connected to the ankle-fixed portion 13 through the rear wire passage 114, the wire guide 16, and the lower wire passage 123 may support the third driving wire w3 not to deform more than necessary or be interfered by an outside in a section connected to the ankle-fixed portion 13 through the thigh strap 11 and the shank strap 12 and at the same time guide the third driving wire w3 passing through the lower wire passage 123 to be connected to the ankle-fixed portion 13 while having an orientation relatively parallel to a longitudinal direction of the shank of the user, thereby providing a force for assisting with the extension of the ankle joint between the shank and the foot of the user using the tension applied to the third driving wire w3.

The controller 17 may selectively drive at least one of the first driving wire w1, the second driving wire w2, and the third driving wire w3 by controlling the drive of the driver 14.

For example, the controller 17 may adjust a rotational driving force for rotating the first wire manipulator 144*a*, the second wire manipulator 144*b*, or the third wire manipulator 144*c* through a drive of the driving actuator 142.

For example, the controller 17 may selectively block or allow the rotational power transmitted between the driving actuator 142 and the first pulley 1441*a* by controlling a drive of the first clutch portion 14421*a* of the first wire manipulator 144*a*.

For example, the controller 17 may selectively block or allow the rotational power transmitted between the driving actuator 142 and the second pulley 1441*b* by controlling a drive of the second clutch gear 1442*b* of the second wire manipulator 144*b*.

For example, the controller 17 may selectively block or allow the rotational power transmitted between the driving actuator 142 and the third pulley 1441*c* by controlling a drive of the third clutch gear 1442*c* of the third wire manipulator 144*c*.

For example, the controller 17 may detect a driving state of each of the first to third driving wires w1 to w3 based on a signal measured by the first sensor 1443*a*, the second sensor 1443*b*, or the third sensor 1443*c*, and determine a gait state of a leg of the user on which the thigh strap 11 or the shank strap 12 is installed through the detected driving state.

For example, the controller 17 may determine which of a stance phase and a swing phase the gait state of the leg of the user is or what detailed gait state the gait state of the leg of the user is, based on the signal measured by the first sensor 1443*a*, the second sensor 1443*b*, or the third sensor 1443*c*.

According to the above structure, the controller 17 may selectively drive a driving wire to assist a joint motion needed in the gait state or the detailed gait state, of the first driving wire w1 to the third driving wire w3, based on the gait state or a gait phase of the user.

For example, the controller 17 may determine a gradient of the ground on which the user is walking based on the signal measured by the first sensor 1443*a*, the second sensor 1443*b*, or the third sensor 1443*c*. For example, the controller 17 may determine whether the ground on the user is walking corresponds to a level ground, stairs, or an uphill road.

According to the above structure, the controller 17 may determine the gradient of the ground on which the user is walking and selectively drive at least one of the first driving wire w1, the second driving wire w2, and the third driving wire w3 to assist with a joint motion needed for walking on the ground having the gradient.

For example, in response to a determination that the user is walking on a level ground, the controller 17 may relatively control at least one driving wire to intensively assist the ankle joint and the hip joint. In response to a determination that the user is walking on stairs or an uphill road, the controller 17 may control at least one driving wire to intensively assist the knee joint. Thus, it is possible to effectively provide an optimized assistance force based on a state of the ground on which the user is walking.

Figure 6:
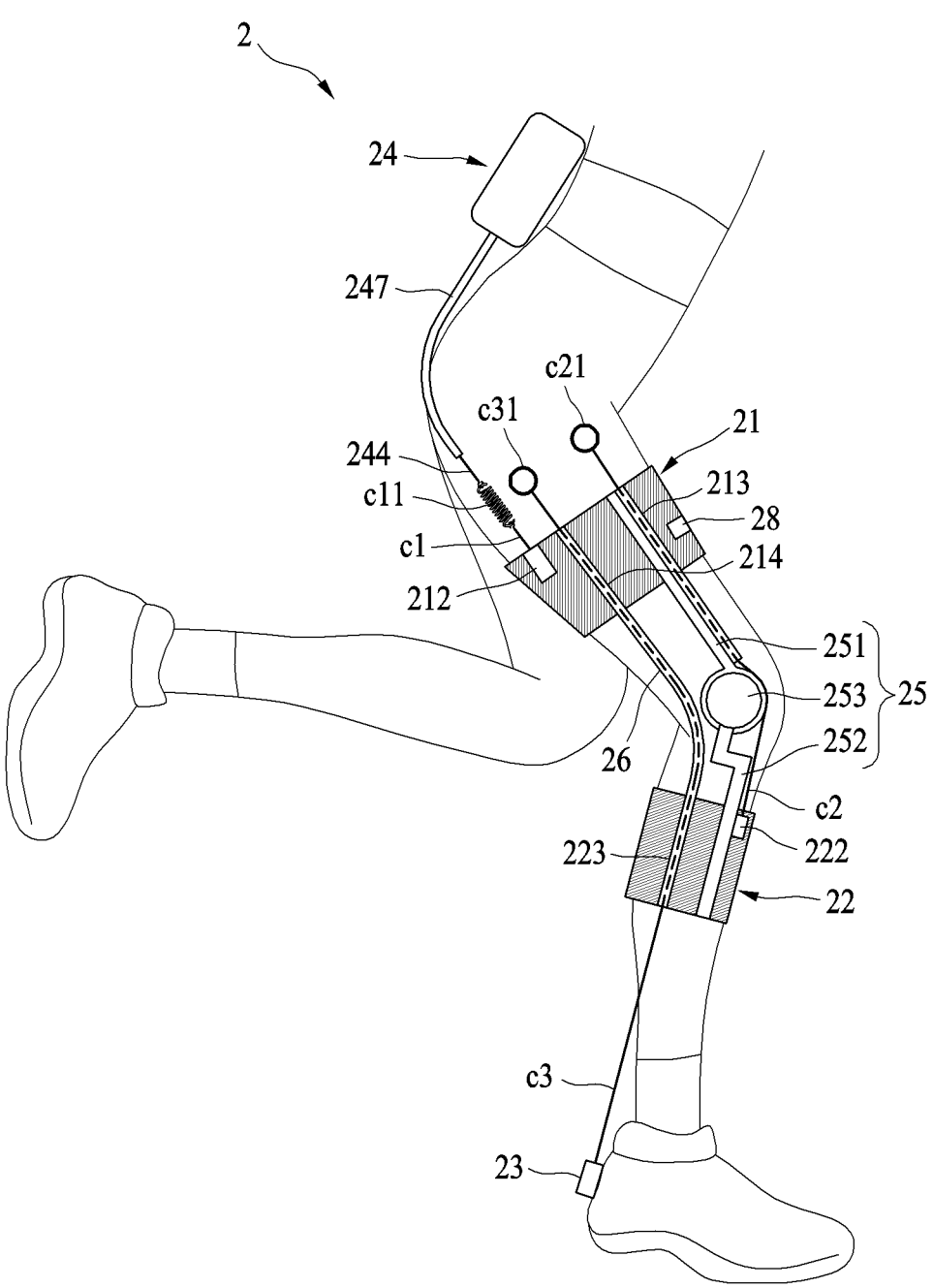
FIG. 6 is a view illustrating a user wearing a flexible wearable robot according to an example embodiment.
Figure 7:
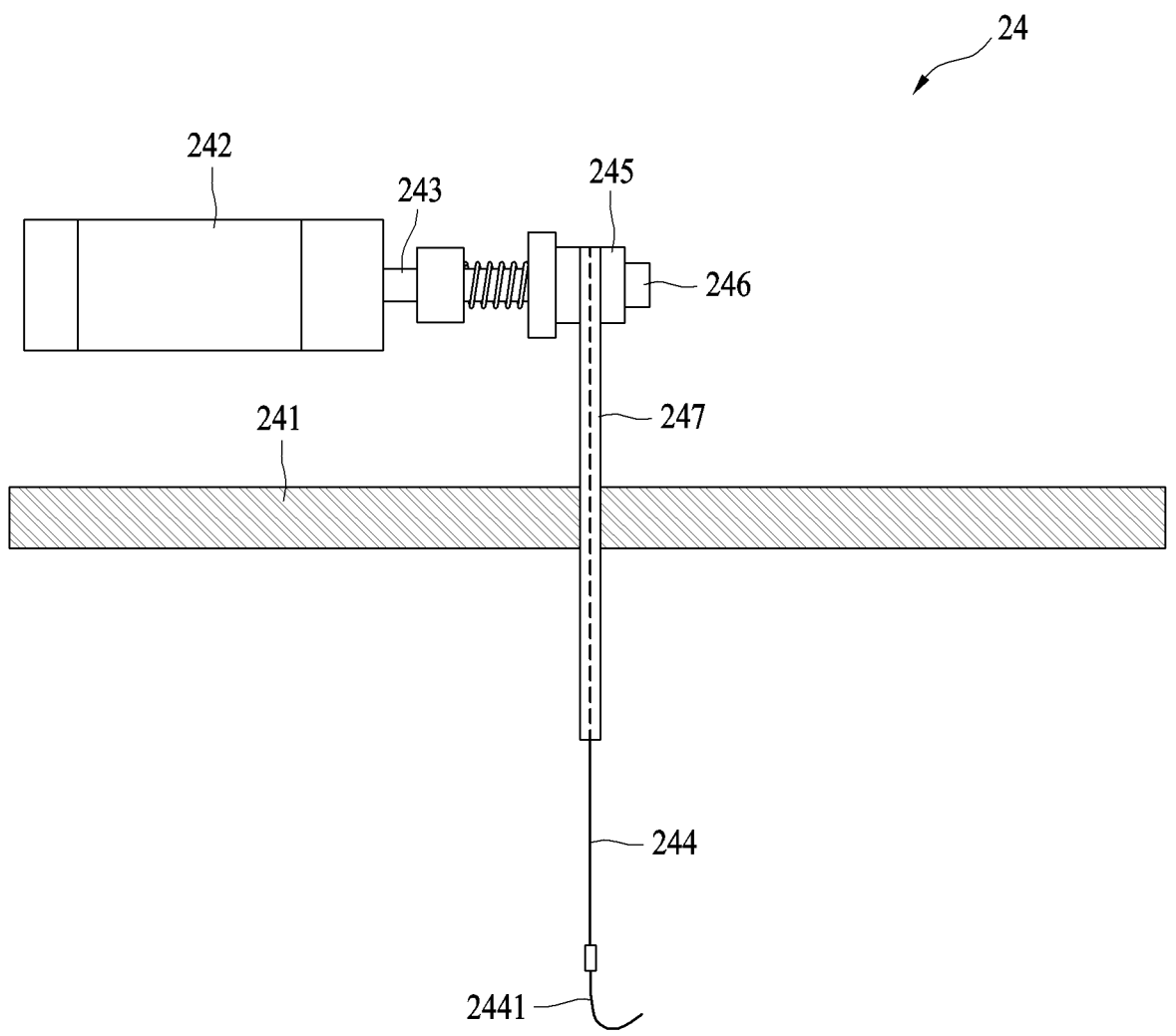
FIG. 7 is a view illustrating a driver of a flexible wearable robot according to an example embodiment.

FIG. 6 is a view illustrating a user wearing a flexible wearable robot according to an example embodiment, and FIG. 7 is a view illustrating a driver of the flexible wearable robot according to an example embodiment.

Referring to FIGS. 6 and 7, a flexible wearable robot 2 may be installed to be worn on a lower limb of a user to provide an assistance force selectively to multiple joints.

Unlike the configuration of the flexible wearable robot 1 shown in FIGS. 1 to 5, the flexible wearable robot 2 may include a configuration for detachably fastening to a thigh strap 21, a shank strap 22, or an ankle-fixed portion 23 selectively through one driving wire 244 to provide an assistance force corresponding to a selected joint.

The flexible wearable robot 2 may include the thigh strap 21 to be worn to enclose a thigh portion of a user, a shank strap 22 to be worn to enclose a shank portion of the user, an ankle-fixed portion 23 installed to be fixed to a heel portion of the user, a driver 24 for providing a driving force for assisting with a joint motion of the user, a driving wire 244 connected from the driver 24 to receive tension, a first fastening wire c1 with one end fixed to the thigh strap 21 and the other end exposed to an outside of the thigh strap 21, a second fastening wire c2 with one end fixed to the shank strap 22 and the other end passing through the thigh strap 21 and exposed to the outside, a third fastening wire c3 with one end fixed to the ankle-fixed portion 23 and the other end passing through the shank strap 22 and the thigh strap 21 and exposed to the outside of the thigh strap 21, a guide frame 25 for guiding a joint motion between the thigh strap 21 and the shank strap 22, a wire guide 26 enclosing the third fastening wire c3 passing through between the thigh strap 21 and the shank strap 22, an inertial sensor 28 for measuring a motion state of the user, and a controller 27 for providing an assistance force necessary for walking of the user through the driving wire 244 by controlling a drive of the driver 24.

The thigh strap 21 may be worn to enclose the thigh portion of the user. For example, the thigh strap 21 may be formed of a flexible lightweight polymer or fiber material.

For example, the thigh strap 21 may include a thigh-fixed portion 212 to which an end portion of the first fastening wire c1 is connected, a front wire passage 213 through which the second fastening wire c2 extending from the driver 24 toward the shank strap 22 passes, and a rear wire passage 214 through which the third fastening wire c3 extending from the driver 24 toward the shank strap 22 passes.

The shank strap 22 may be worn to enclose the shank portion of the user. For example, the shank strap 22 may be formed of a flexible lightweight polymer or fiber material.

For example, the shank strap 22 may include a shank-fixed portion 222 to which an end portion of the second fastening wire c2 connected from the driver 24 is connected, and a lower wire passage 223 through which the third fastening wire c3 extending from the driver 24 toward the ankle-fixed portion 23 passes.

The ankle-fixed portion 23 may be installed to be fixed to the heel portion of the user, and an end portion of the third fastening wire c3 connected from the driver 24 may be connected to the ankle-fixed portion 23.

For example, the ankle-fixed portion 23 may be installed to be worn on a foot of the user. For example, the ankle-fixed portion 23 may be installed on a heel portion of a shoe of the user.

The driver 24 may provide a driving force to assist with a joint motion of the user. For example, the driver 24 may be selectively connected to the first fastening wire c1, the second fastening wire c2, or the third fastening wire c3 and extend the corresponding wire.

The driver 24 may include a housing 241 to be worn by the user, a driving actuator 242 for generating a driving force, a rotating shaft 243 connected to the driving actuator 242 to rotate, a driving pulley 245 rotatably connected to the rotating shaft 243, the driving wire 244 with one end fixed to and wound on the driving pulley 245 and the other end protruding and extending toward an inside of the housing 241 to be detachably fastened to the first fastening wire c1, the second fastening wire c2, or the third fastening wire c3, a rotation detecting sensor 246 for detecting a rotational displacement of the driving pulley 245, and a wire tube 247 for guiding to enclose a portion of the driving wire 244 that passes through the housing 241 and protrudes to an outside.

For example, the driving wire 244 may include a hook-shaped fastening end portion 2441 with the other end protruding to the outside of the driver 24 to be detachably fastened to the first fastening wire c1, the second fastening wire c2, or the third fastening wire c3.

One end of the first fastening wire c1 may be fixed to the thigh-fixed portion 212, and the other end thereof may protrude upward from the thigh strap 21.

For example, the first fastening wire c1 may include a first fastening member c11 exposed to an outside of the thigh strap 21 and detachably fastened to the driving wire 244.

For example, the first fastening member c11 may be a loop-shaped member to be fastened to the hook-shaped fastening end portion 2441 of the driving wire 244.

For example, the first fastening member c11 may further include a spring interposed to adjust initial tension applied to the first fastening wire c1 in the drive by the driving wire 244.

One end of the second fastening wire c2 may be fixed to the shank-fixed portion 222, and the other end thereof may pass through the front wire passage 213 and then be exposed upward from the thigh strap 21.

For example, the second fastening wire c2 may include a second fastening member c21 exposed to the outside of the thigh strap 21 and detachably fastened to the driving wire 244.

One end of the third fastening wire c3 may be fixed to the ankle-fixed portion 23, and the other end thereof may sequentially pass through the lower wire passage 223 and the rear wire passage 214 and then be exposed upward from the thigh strap 21.

For example, the third fastening wire c3 may include a third fastening member c31 exposed to the outside of the thigh strap 21 and detachably fastened to the driving wire 244.

The guide frame 25 may have a two-segment link structure connected between the thigh strap 21 and the shank strap 22. Alternatively, the guide frame may have a four-segment link structure.

For example, the guide frame 25 may include an upper frame 251 fixed to the thigh strap 21, a lower frame 252 fixed to the shank strap 22, and a joint portion 253 mutually rotatably connecting the upper frame 251 and the lower frame 252.

For example, the guide frame 25 may support the front wire passage 213 and a portion of the second fastening wire c2 protruding downward from the thigh strap 21 not to unnecessarily deform, and guide a path of the second fastening wire c2 such that the second fastening wire c2 passing through the front wire passage 213 may be stably hung on a pulley portion formed on an outer circumferential surface of the joint portion 253.

The wire guide 26 may be a flexible tubular member enclosing the third fastening wire c3 extending between the thigh strap 21 and the shank strap 22.

For example, the wire guide 26 may be connected between the rear wire passage 214 of the thigh strap 21 and the lower wire passage 223 of the shank strap 22. For example, as shown in FIG. 6, the wire guide 26, the rear wire passage 214, and the lower wire passage 223 may be integrally connected and formed as a single tubular member.

The inertial sensor 28 may be an inertial measurement unit (IMU) sensor installed at least one of the driver 24, the thigh strap 21, the shank strap 22, and the ankle-fixed portion 23.

The controller 27 may control the drive of the driver 24 to drive the first fastening wire c1, the second fastening wire c2, or the third fastening wire c3.

For example, the controller 27 may determine a gradient of a ground on which the user is walking based on a signal measured by the rotation detecting sensor 246 or the inertial sensor 28. For example, the controller 27 may determine whether the ground on the user is walking corresponds to a level ground, stairs, or an uphill road.

According to the above structure, the controller 27 may determine the gradient of the ground on which the user is walking, and adjust and provide an assistance force optimized for walking on the ground having the gradient.

According to the flexible wearable robot 2, the user may selectively fasten the driving wire 244 to one of the first fastening wire c1, the second fastening wire c2, and the third fastening wire c3, thereby selectively receiving an assistance force for a desired joint of lower-limb joints of the user.

Figure 8:
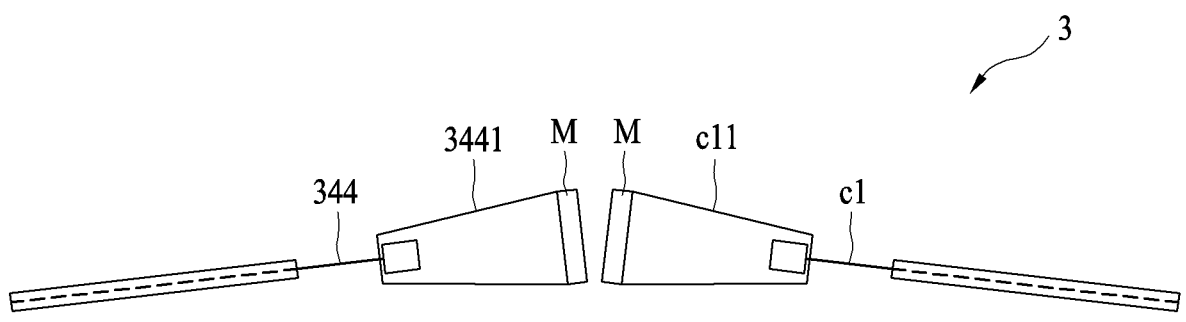
FIG. 8 is a view illustrating a fastening structure of a driving wire according to an example embodiment.

FIG. 8 is a view illustrating a fastening structure of a driving wire according to an example embodiment. Referring to FIG. 8, a detachable fastening structure between a driving wire 344 and a first fastening wire c1 is shown.

For example, a fastening end portion 3441 of the driving wire 344 and a first fastening member c11 of the first fastening wire c1 may include respective magnet members M that detachably attach to each other.

Although the fastening structure between the driving wire 344 and the first fastening wire c1 has been described with reference to FIG. 8, the above structure may also apply to the second fastening wire c2 or the third fastening wire c3 described above.

Figure 9:
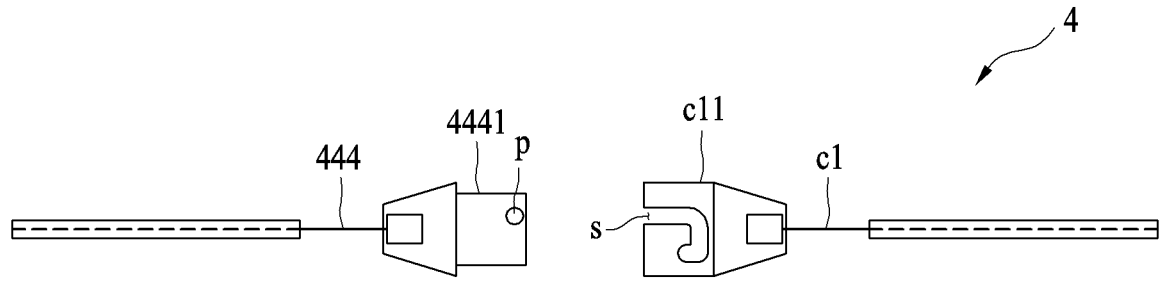
FIG. 9 is a view illustrating a fastening structure of a driving wire according to an example embodiment.

FIG. 9 is a view illustrating a fastening structure of a driving wire according to an example embodiment. Referring to FIG. 9, a detachable fastening structure between a driving wire 444 and a first fastening wire c1 is shown.

For example, a fastening end portion 4441 of the driving wire 444 and a first fastening member c11 of the first fastening wire c1 may include a protrusion p and a groove s to be coupled to each other by engagement.

For example, the first fastening end portion 4441 may include the protrusion p that protrudes laterally.

For example, the first fastening member c11 may include the groove s that is in the shape of a slot in which the protrusion p may be inserted and received when coupled to the first fastening end portion 4441.

For example, the groove s may have a shape that is bent as shown in FIG. 9 to maintain the protrusion p in the state of being received therein.

Although the fastening structure between the driving wire 444 and the first fastening wire c1 has been described with reference to FIG. 9, the above structure may also apply to the second fastening wire c2 or the third fastening wire c3 described above.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

What is claimed is:

1. A flexible wearable robot for assisting with a walking motion of a user, the flexible wearable robot comprising:

a thigh strap to be worn to enclose a thigh portion of the user;

a shank strap to be worn to enclose a shank portion of the user;

a driver to be worn on a back or waist portion of the user to provide a driving force for assisting with a walking motion of the user;

a first driving wire with one end connected to the thigh strap and another end connected to the driver to receive tension;

a second driving wire with one end connected to the shank strap and another end connected to the driver to receive tension; and a controller to control a drive of the driver to selectively apply tension to at least one of the first driving wire and the second driving wire, the thigh strap comprises:

a thigh-fixed portion to which an end portion of the first driving wire connected from the driver is connected, and which is installed on a rear side of the thigh strap based on the user; and a front wire passage for receiving and enclosing the second driving wire extending from the driver toward the shank strap, and installed on a front side of the thigh strap based on the user, and the shank strap comprises:

a shank-fixed portion to which an end portion of the second driving wire connected from the driver is connected, and which is installed on a front side of the shank strap based on the user, a guide frame formed in a link structure connecting the thigh strap and the shank strap to guide a knee joint motion of the user, wherein a portion of the guide frame connected to the thigh strap is installed to be parallel with and touch a rear side of the front wire passage.

2. The flexible wearable robot of claim 1, wherein the driver comprises:

a driving actuator for generating a rotational driving force;

a rotating shaft connected to the driving actuator to be rotationally driven;

a first wire manipulator installed to rotate by means of the rotating shaft with one end of the first driving wire fixed; and a second wire manipulator installed to rotate by means of the rotating shaft with one end of the second driving wire fixed, wherein the controller selectively drives at least one of the first wire manipulator and the second wire manipulator.

3. The flexible wearable robot of claim 2, wherein the first wire manipulator comprises:

a first pulley rotatably installed with one side of the first driving wire hung thereon; and a first clutch gear installed on the rotating shaft to be connected to selectively engage with the first pulley when driven by the controller to transmit a rotational driving force, and the second wire manipulator comprises:

a second pulley rotatably installed with one side of the second driving wire hung thereon; and a second clutch gear installed on the rotating shaft to be connected to selectively engage with the second pulley when driven by the controller to transmit a rotational driving force, wherein the controller selectively drives at least one of the first clutch gear and the second clutch gear to selectively apply tension to the first driving wire or the second driving wire.

4. The flexible wearable robot of claim 2, further comprising:

an ankle-fixed portion to be worn on a heel portion of the user;

a third driving wire with one end connected to the shank strap and the other another end connected to the driver to receive tension; and a wire guide enclosing the third driving wire extending between the thigh strap and the shank strap, wherein the controller controls the drive of the driver to selectively apply tension to at least one of the first driving wire, the second driving wire, and the third driving wire.

5. The flexible wearable robot of claim 4, wherein the thigh strap further comprises:

a rear wire passage for receiving and enclosing the third driving wire extending from the driver toward the shank strap, and installed on a rear side of the thigh strap based on the user, and the shank strap further comprises:

a lower wire passage for receiving and enclosing the third driving wire extending from the driver via the thigh strap toward the ankle-fixed portion, and installed on a rear side of the shank strap based on the user.

6. The flexible wearable robot of claim 5, further comprising:

an inertial sensor installed on at least one of the thigh strap, the shank strap, and the ankle-fixed portion, wherein the controller (i) determines a gradient of a ground that the user walks on based on a signal measured by the inertial sensor, and (ii) drives, based on the gradient, at least one of the first driving wire, the second driving wire, and the third driving wire to assist with a joint motion necessary for walking on the ground having the gradient.

7. A flexible wearable robot for assisting with a walking motion of a user, the flexible wearable robot comprising:

a thigh strap to be worn to enclose a thigh portion of the user;

a shank strap to be worn to enclose a shank portion of the user:

a driver to be worn on a back or waist portion of the user to provide a driving force for assisting with a walking motion of the user;

a first driving wire with one end connected to the thigh strap and another end connected to the driver to receive tension;

a second driving wire with one end connected to the shank strap and another connected to the driver to receive tension; and a controller to control a drive of the driver to selectively apply tension to at least one of the first driving wire and the second driving wire, the thigh strap comprises:

a thigh-fixed portion to which an end portion of the first driving wire connected from the driver is connected, and which is installed on a rear side of the thigh strap based on the user; and a front wire passage for receiving and enclosing the second driving wire extending from the driver toward the shank strap, and installed on a front side of the thigh strap based on the user, and the shank strap comprises:

a shank-fixed portion to which an end portion of the second driving wire connected from the driver is connected, and which is installed on a front side of the shank strap based on the user, wherein the driver comprises:

a driving actuator for generating a rotational driving force;

a rotating shaft connected to the driving actuator to be rotationally driven;

a first wire manipulator installed to rotate by means of the rotating shaft with one end of the first driving wire fixed; and a second wire manipulator installed to rotate by means of the rotating shaft with one end of the second driving wire fixed, wherein the controller selectively drives at least one of the first wire manipulator and the second wire manipulator, wherein the first wire manipulator comprises:

a first pulley rotatably installed with one side of the first driving wire hung thereon; and a first clutch gear installed on the rotating shaft to be connected to selectively engage with the first pulley when driven by the controller to transmit a rotational driving force, and the second wire manipulator comprises:

a second pulley rotatably installed with one side of the second driving wire hung thereon; and a second clutch gear installed on the rotating shaft to be connected to selectively engage with the second pulley when driven by the controller to transmit a rotational driving force, wherein the controller selectively drives at least one of the first clutch gear and the second clutch gear to selectively apply tension to the first driving wire or the second driving wire, wherein the first pulley and the second pulley comprise internal gear portions that are toothed along inner circumferential surfaces thereof, respectively, and the first clutch gear and the second clutch gear comprise a first clutch portion and a second clutch portion to be linearly driven in a direction perpendicular to the rotating shaft to selectively engage with the internal gear portions of the first pulley and the second pulley, respectively.

8. The flexible wearable robot of claim 7, further comprising:

a guide frame formed in a link structure connecting the thigh strap and the shank strap to guide a knee joint motion of the user, wherein a portion of the guide frame connected to the thigh strap is installed to be parallel with and touch a rear side of the front wire passage.

9. The flexible wearable robot of claim 8, wherein the guide frame comprises:

an upper frame fixed to the thigh strap and protruding toward the shank strap;

a lower frame fixed to the shank strap and protruding toward the thigh strap; and a joint portion mutually rotatably connecting respective protrusions of the upper frame and the lower frame, wherein the joint portion has a pulley shape in which a groove is formed along an outer circumferential surface thereof such that the second driving wire is hung thereon.

10. A flexible wearable robot for assisting with a walking motion of a user, the flexible wearable robot comprising:

a thigh strap to be worn to enclose a thigh portion of the user;

a shank strap to be worn to enclose a shank portion of the user;

an ankle-fixed portion to be worn on a heel portion of the user;

a driver to be worn on a back or waist portion of the user to provide a driving force for assisting with a walking motion of the user;

a driving wire connected from the driver to receive tension;

a first fastening wire with one end fixed to the thigh strap and another end exposed to an outside of the thigh strap;

a second fastening wire with one end fixed to the shank strap and another end passing through the thigh strap and exposed to the outside of the thigh strap; and a third fastening wire with one end fixed to the ankle-fixed portion and another end sequentially passing through the shank strap and the thigh strap and exposed to the outside, a guide frame formed in a link structure connecting the thigh strap and the shank strap to guide a knee joint motion of the user, wherein the guide frame comprises:

an upper frame fixed to the thigh strap and protruding toward the shank strap;

a lower frame fixed to the shank strap and protruding toward the thigh strap; and a joint portion mutually rotatably connecting respective protrusions of the upper frame and the lower frame, wherein the joint portion has a pulley shape in which a groove is formed along an outer circumferential surface thereof such that the second fastening wire is hung thereon.

11. A flexible wearable robot for assisting with a walking motion of a user, the flexible wearable robot comprising:

a thigh strap to be worn to enclose a thigh portion of the user;

a shank strap to be worn to enclose a shank portion of the user;

an ankle-fixed portion to be worn on a heel portion of the user;

a driver to be worn on a back or waist portion of the user to provide a driving force for assisting with a walking motion of the user;

a driving wire connected from the driver to receive tension;

a first fastening wire with one end fixed to the thigh strap and another end exposed to an outside of the thigh strap;

a second fastening wire with one end fixed to the shank strap and another end passing through the thigh strap and exposed to the outside of the thigh strap; and a third fastening wire with one end fixed to the ankle-fixed portion and another end sequentially passing through the shank strap and the thigh strap and exposed to the outside, wherein the driving wire is detachably fastened to the first fastening wire, the second fastening wire, or the third fastening wire.

12. The flexible wearable robot of claim 11, further comprising:

a guide frame formed in a link structure connecting the thigh strap and the shank strap to guide a knee joint motion of the user, wherein the guide frame comprises:

an upper frame fixed to the thigh strap and protruding toward the shank strap;

a lower frame fixed to the shank strap and protruding toward the thigh strap; and a joint portion mutually rotatably connecting respective protrusions of the upper frame and the lower frame, wherein the joint portion has a pulley shape in which a groove is formed along an outer circumferential surface thereof such that the second fastening wire is hung thereon.

13. The flexible wearable robot of claim 11, wherein the driving wire comprises a hook-shaped fastening end portion at an end portion protruding toward an outside of the driver, and the first fastening wire, the second fastening wire, or the third fastening wire comprises a ring-shaped fastening member to be fastened to the fastening end portion at an end portion exposed to the outside of the thigh strap.

14. The flexible wearable robot of claim 11, wherein the driving wire comprises a fastening end portion with a magnet member at an end portion protruding toward an outside of the driver, and the first fastening wire, the second fastening wire, or the third fastening wire comprises a fastening member with a magnet member to be coupled to the fastening end portion at an end portion exposed to the outside of the thigh strap.

15. The flexible wearable robot of claim 11, wherein the driving wire comprises a fastening end portion with a protrusion protruding laterally at an end portion protruding toward an outside of the driver, and the first fastening wire, the second fastening wire, or the third fastening wire comprises a fastening member with a groove in a slot shape to receive and engage with the protrusion of the fastening end portion and to be coupled to the fastening end portion at an end portion exposed to an outside of the thigh strap.

* * * * *